(12) United States Patent
Okumura et al.

(10) Patent No.: US 10,780,351 B2
(45) Date of Patent: Sep. 22, 2020

(54) INFORMATION PROCESSING DEVICE AND INFORMATION PROCESSING PROGRAM

(71) Applicant: DeNA Co., Ltd., Shibuya-ku, Tokyo (JP)

(72) Inventors: Jun Okumura, Tokyo (JP); Yu Kono, Tokyo (JP); Ikki Tanaka, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 53 days.

(21) Appl. No.: 16/234,401

(22) Filed: Dec. 27, 2018

(65) Prior Publication Data

US 2019/0336862 A1 Nov. 7, 2019

(30) Foreign Application Priority Data

Dec. 28, 2017 (JP) ................................ 2017-253701

(51) Int. Cl.
*A63F 13/67* (2014.01)
*A63F 13/79* (2014.01)
*G06N 20/00* (2019.01)

(52) U.S. Cl.
CPC .............. *A63F 13/67* (2014.09); *A63F 13/79* (2014.09); *G06N 20/00* (2019.01)

(58) Field of Classification Search
None
See application file for complete search history.

(56) References Cited

U.S. PATENT DOCUMENTS

| | | | | |
|---|---|---|---|---|
| 2003/0083117 A1* | 5/2003 | Rupert | ...................... | G06T 7/20 463/4 |
| 2004/0259616 A1* | 12/2004 | Hirai | ...................... | A63F 13/56 463/4 |
| 2006/0246973 A1* | 11/2006 | Thomas | .................. | A63F 13/79 463/4 |

(Continued)

FOREIGN PATENT DOCUMENTS

JP 2013-81683 A 5/2013

OTHER PUBLICATIONS

Mastering the game of Go without human knowledge, David Silver, Oct. 19, 2017, http://augmentingcognition.com/assets/Silver2017a.pdf.*

(Continued)

*Primary Examiner* — Jason T Yen
(74) *Attorney, Agent, or Firm* — Procopio, Cory Hargreaves & Savitch LLP (57) ABSTRACT

An information processing device comprises a representation learning unit for learning characteristic vectors representing the various characteristics of objects, on the basis of a game log, which is game progress history related to an electronic game in which a plurality of objects are used and which comprises information about the game situation including information about objects that affect the game, information about objects used in said situation from among said objects, and information indicating the effect on the game arising from the use of said objects, wherein the characteristic vectors are found by performing learning (Continued)

using a combination of information about the effect on the game and information obtained by excluding the information about at least one of the objects from the information about the game situation.

14 Claims, 9 Drawing Sheets

(56) References Cited

U.S. PATENT DOCUMENTS

| | | | | |
|---|---|---|---|---|
| 2011/0225108 | A1* | 9/2011 | Hawkins | G06N 3/049 706/12 |
| 2013/0097107 | A1* | 4/2013 | Kobayashi | G06N 3/126 706/12 |
| 2018/0349555 | A1* | 12/2018 | Devarakonda | G06N 5/003 |

OTHER PUBLICATIONS

Office Action for related Japanese Patent Application No. 2017-253701, dated Jul. 31, 2018; English translation provided; 6 pages.
Silver et al., "Mastering the Game of Go with Deep Neural Networks and Tree Search," Nature, Jan. 28, 2016, pp. 484-489 (20 pages); vol. 529; Macmillan Publishers Limited.
Honda et al., "Theory and Algorithm of Bandit Problems", Kodansha Co., Ltd., Aug. 24, 2016, pp. 127-129.
Tomiyasu et al., "Detecting Soccer Player Behavior of Making Pass Courses" Image Laboratory, Nippon Kogyo Publishing Co., Ltd., Sep. 10, 2014, vol. 25, No. 9, Issue No. 297, pp. 8-14.
Inaba et al., "Are You Going to be Killed if You Are Always Chatting?—Proposal of Speech Act Tag Set in Werewolf Same, and Analysis of Player Behavior and Win/Loss," Journal of Information Processing Society of Japan, vol. 57, No. 11 (online), Japan, Information Processing Society of Japan, Nov. 18, 2016, pp. 2392-2402.

* cited by examiner

| Character name | Attribute | Rarity | Attack power | Skill name | Skill activation condition | Skill effect |
|---|---|---|---|---|---|---|
| ... | ... | ... | ... | ... | ... | ... |
| C0022 | P1 | S | 30 | S001 | HP level ≤ 5% of maximum HP level | Four times the damage of a normal attack is inflicted |
| ... | ... | ... | ... | ... | ... | ... |
| C0158 | P1 | A | 20 | S002 | Player characters with attribute P1 on the board ≥ 3 | Twice the damage of a normal attack is inflicted |
| ... | ... | ... | ... | ... | ... | ... |
| C0241 | P2 | B | 10 | S003 | Player characters with attribute P2 on the board ≥ 2 | Damage equal to 10 times the number of turned over pieces is inflicted |
| ... | ... | ... | ... | ... | ... | ... |

| Turn number | Placed character | Placement location | Color of piece on square 1A | Number of turned over pieces | Skill activation | Skill effect value | Remaining HP |
|---|---|---|---|---|---|---|---|
| First player 1 | C0048 | 3E | White | 1 | 1 | 36 damage | 300 |
| Second player 1 | C0008 | 2C | White | 1 | 0 | | 280 |
| First player 2 | C0009 | 4B | White | 1 | 0 | | 300 |
| Second player 2 | C0097 | 4E | White | 1 | 1 | 42 damage | 280 |
| First player 3 | C0055 | 1C | White | 2 | 0 | | 258 |
| Second player 3 | C0076 | 4A | White | 3 | 1 | 128 damage | 280 |
| ... | ... | ... | ... | ... | ... | ... | ... |

INFORMATION PROCESSING DEVICE AND INFORMATION PROCESSING PROGRAM

This application claims foreign priority under 35 USC 119 based on Japanese Patent Application No. 2017-253701, filed on Dec. 28, 2017, the contents of which is incorporated herein in its entirety by reference.

BACKGROUND

1. Field

The present invention relates to an information processing device and an information processing program (e.g., non-transitory computer-readable medium including instructions to be performed on a processor), and more particularly relates to an information processing device and an information processing program that provide an electronic game.

2. Related Art

Information processing devices that provide an electronic game have been known in the past. One known electronic game that is provided by such an information processing device is an electronic game in which a plurality of objects (in-game objects) such as characters and cards are used. An example of this is a battle game in which a player fights an opponent that is a computer or another player while using a plurality of objects.

Meanwhile, a great deal of research into machine learning has been conducted in recent years. For instance, research has been conducted that is related to deep learning using multilayer neural networks. This deep learning is used to cause an artificial intelligence (AI) agent that plays an electronic game to learn, and is realized by an AI agent capable of higher performance than conventional ones (that is, one that is "good" at the game). For example, Non-Patent Literature 1 discloses a technique relating to a deep neural network applied to an AI agent playing the game of go.

PRIOR-ART DOCUMENTS

Non-Patent Documents

Non-Patent Literature 1: David Silver, et al., "Mastering the Game of Go with Deep Neural Networks and Tree Search," Nature 529, 484-489, (28 Jan. 2016)

SUMMARY

Problems to be Solved by the Invention

In electronic games such as go and shogi (Japanese chess), the types of objects that can be used are limited. For example, in go, the only types of objects involved are white stones and black stones, and in shogi, there are only a limited number of types of objects such as king, rook, promoted rook, bishop, promoted bishop, etc. In learning by an AI agent that plays an electronic game, it is necessary to learn after first identifying the objects that are used in the electronic game. In the case of go and shogi, as mentioned above, since there are only a few kinds of objects, performing identification by individually labeling each object by a technique such as one-hot vector poses no particular problems.

However, in the case of learning by an AI agent that plays an electronic game in which a large number of objects are used (such as, for example, well over a thousand or more), individually labeling each object means that the vectors representing the objects will have a huge number of dimensions. Consequently, a problem arises in that processing for game play in the AI agent or learning processing by the AI agent becomes quite complicated.

Also, it is hard for a game planner to properly set the skill effect or attack power. If the skill activation condition is simply given by a numerical value representing a probability, it is relatively easy for the planner to set an appropriate skill effect or attack power based on the probability (numerical value) of skill activation. However, when the skill activation condition is prescribed by a condition related to the game situation, it is not so easy to grasp the probability of activating the skill of a character, and this makes it difficult to appropriately set the skill effect or attack power of a new character.

Also, it is hard for a player to appropriately select a character to be put in a deck because the skill activation condition for each character is specified by a condition related to the game situation. In other words, it is not easy for the player to ascertain the degree of probability that a character will activate a skill, even after seeing the skill activation condition for that character.

Also, if there are a large number of objects, there may be objects with similar characteristics (such as their effect on the game when used). In learning by an AI agent, there are situations in which it is sufficient if objects having similar characteristics are learned in the same way. To put this another way, since there is little need for objects having similar characteristics to be distinguished from one another, it will sometimes be inefficient to identify and learn objects having similar characteristics.

It is an object of the present invention to realize representation learning that is suited to learning by an artificial intelligence agent playing an electronic game in which a plurality of objects are used.

Means for Solving Problem

One embodiment of the present invention is an information processing device comprising a representation learning unit for learning characteristic vectors representing the various characteristics of objects, on the basis of a game log, which is game progress history related to an electronic game in which a plurality of objects are used and which comprises information about the game situation including information about objects that affect the game, information about objects used in said situation from among said objects, and information indicating the effect on the game arising from the use of said objects, wherein the characteristic vectors are found by performing learning using a combination of information about the effect on the game and information obtained by excluding the information about at least one of the objects from the information about the game situation.

Another mode of the present invention is an information processing program (e.g., non-transitory computer-readable medium including instructions to be performed on a processor) for causing a computer to function as a representation learning unit for learning characteristic vectors representing the various characteristics of objects, on the basis of a game log, which is game progress history related to an electronic game in which a plurality of objects are used and which comprises information about the game situation including information about objects that affect the game, information about objects used in said situation from among said objects, and information indicating the effect on the game arising from the use of said objects, said representation learning unit finding the characteristic vectors by performing learning using a combination of information about the effect on the game and information obtained by excluding the information about at least one of the objects from the information about the game situation.

Here, it is preferable to find the characteristic vectors by performing learning using information about the effect on the game and information obtained by excluding the information about the used object from the information about the game situation.

It is also preferable to find the characteristic vectors by performing learning using information about the effect on the game and information obtained by excluding the information about an object used during attack by an ally from the information about the game situation.

It is also preferable to find the characteristic vectors by performing learning using information about the effect on the game and information obtained by excluding the information about an object used during defense by an ally from the information about the game situation.

It is also preferable for the information about an object excluded from the information about the game situation to be information about one object.

It is also preferable for the characteristic vectors found by the information processing device to be combined into an overall characteristic vector for each of the plurality of objects.

It is also preferable for the information processing device to further comprise a strategy learning unit that uses the game log and the characteristic vectors of the various objects learned by the representation learning unit to cause an artificial intelligence agent playing the electronic game to learn a strategy related to use of the plurality of objects.

Effects of the Invention

The present invention allows an appropriate characteristic vector (distributed representation) of a character to be obtained by representation learning. This makes it possible for an artificial intelligence agent that plays an electronic game in which a plurality of objects are used to learn more efficiently.

DETAILED DESCRIPTION

An embodiment of the present invention will now be described.

Figure 1:
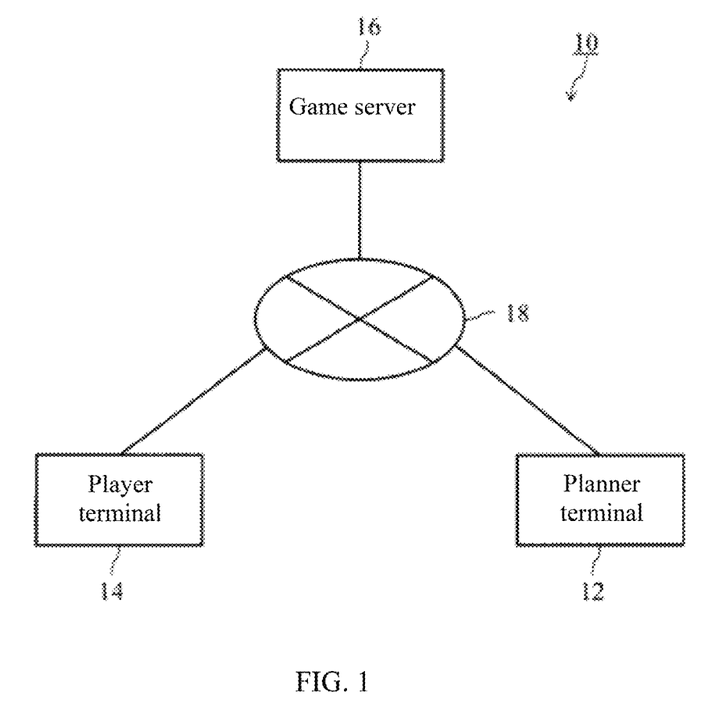
FIG. 1 A simplified configuration diagram of the game system according to an embodiment.

FIG. 1 is a simplified configuration diagram of the game system 10 according to this embodiment. The game system 10 includes a planner terminal 12 that is used by the developer of the electronic game provided by the game system 10 (hereinafter simply referred to as "this game"), or more precisely, by the planner who is the creator of objects used in this game, a player terminal 14 that is used by the player of this game, and a game server 16 serving as an information processing device. The planner terminal 12 and the game server 16, and the player terminal 14 and the game server 16 are connected so as to be able to communicate via a communication line 18. The communication line 18 is constituted by, for example, the Internet or a local area network (LAN). In FIG. 1, only one planner terminal 12 and one player terminal 14 are shown, but a plurality of each of these may be provided.

In the game system 10, the planner uses the planner terminal 12 to access the game server 16, and can thereby develop this game, including the creation of objects. Then, in response to a request to provide this game that is transmitted from the player terminal 14, the game server 16 transmits various kinds of game information to the player terminal 14 so that this game is provided.

Figure 2:
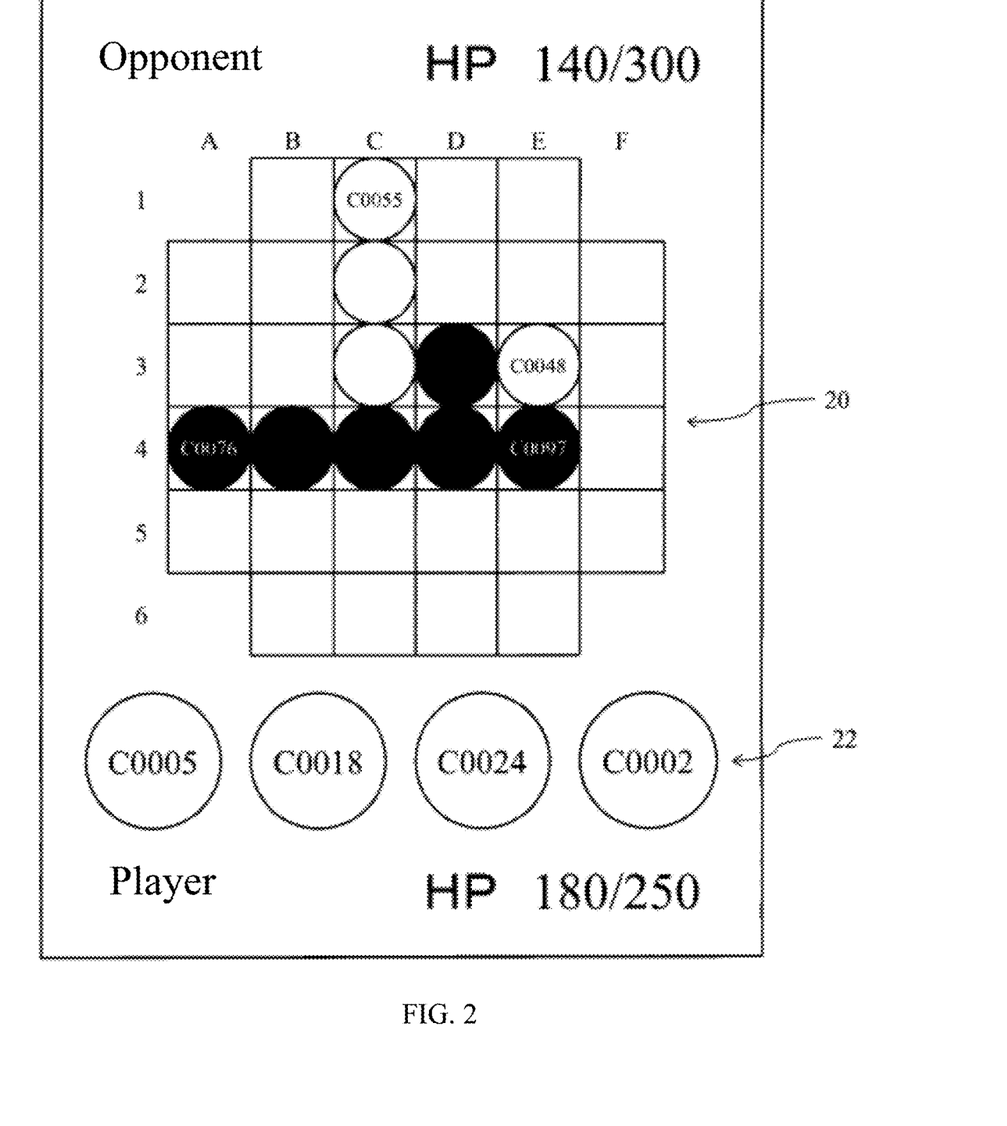
FIG. 2 A diagram showing an example of a game screen in a game provided by the game system according to this embodiment.

The content of this game will now be described. FIG. 2 shows an example of the game screen displayed on the player terminal 14. This game uses a plurality of characters as objects to do battle with an opponent. The opponent may be someone other than the player himself, or may be a computer (the game server 16). More specifically, the player and the opponent take turns arranging characters on a board 20 marked with a plurality of squares as game fields in the manner of Othello (registered trademark). In FIG. 2, the rows of squares are numbered 1 to 6, and the columns are lettered A to F.

The white circles on the board 20 indicate the stones (white stones) of the player, and the black circles indicate the stone (black stones) of the opponent. A character name (such as "C0055") written in a white circle on the board 20 indicates a character belonging to the player (player character), and a character name written in a black circle indicates a character belonging to the opponent (opponent character). When an opponent character or a black stone is sandwiched between two player characters, or one white stone and one player character, the opponent character or black stone can be changed into a white stone (flipped over). When a player character or a white stone is sandwiched between two opponent characters, or one black stone and one opponent character, the player character or white stone is changed into a black stone. Just as in ordinary Othello, at the start of the game, two white stones and two black stones may be placed in the four squares at the center of the board 20. That is, white stones are placed in the 3C square and the 4D square, and black stones are placed in the 3D square and the 4C square.

The player selects a plurality of characters defined in this game, and a plurality of characters are selected from among the characters acquired by that player (made available in the game). For example, in this embodiment, 16 characters are selected. The group of 16 characters selected by the player is called a deck. The player can acquire new characters as the game proceeds, or for a fee. As shown in FIG. 2, the four characters selected from the deck are displayed on the screen. These four characters are called pieces in hand 22. The pieces in hand 22 may be randomly selected from the deck by the game server 16, or the player may be able to select them from the deck. The user selects some character from among the four pieces in hand 22, and places the selected character on a square on the board 20. When one of the characters among the pieces in hand 22 is placed on the board 20, a character selected from the deck is newly added to the pieces in hand 22.

A plurality of parameters are set for each character, which will be discussed in detail below. For instance, parameters such as attack power, skill effect, and skill activation condition are set. When a character is placed on the board 20, damage may be inflicted on the opponent according to the attack power of the character. Alternatively, if the skill activation condition of the character is met, a skill (technique) is executed as a special effect possessed by the character, and the effect on the game is activated according to the skill effect (or the skill effect and the attack power).

Hit points (HP) are set for each player and opponent. In FIG. 2, the maximum HP of the player is shown to be 250, and the current HP is 180. The opponent's HP can be reduced by placing a character on the board 20 or by executing a skill. Also, the configuration may be such that the HP can be restored by the skill of a character. The first to reach an HP of zero is the loser, and the other one is the winner.

Thus, the game provided by the game system 10 is a game in which the player battles against an opponent while using a plurality of characters.

Figure 3:
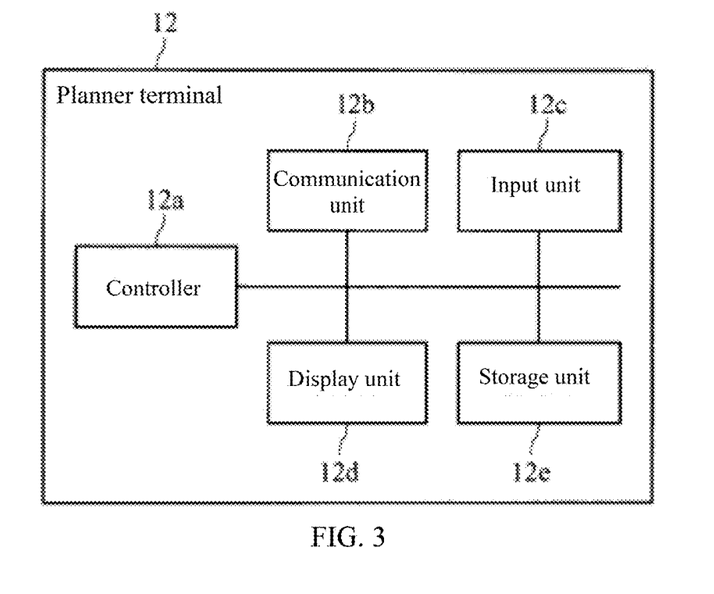
FIG. 3 A simplified configuration diagram of a planner terminal.

FIG. 3 is a simplified configuration diagram of the planner terminal 12. The planner terminal 12 may be an ordinary computer, for example.

A controller 12a is constituted by, for example, a CPU (central processor) or a microprocessor, and controls the various components of the planner terminal 12 in accordance with a program (e.g., non-transitory computer-readable medium including instructions to be performed on a processor) stored in a storage unit 12e (discussed below).

A communication unit 12b is constituted by a network adapter, for example, and has the function of communicating with the game server 16 via the communication line 18.

An input unit 12c is constituted by, for example, a mouse, a keyboard, a touch panel, or the like. The input unit 12c is for inputting instructions from the planner to the planner terminal 12.

The display unit 12d is constituted by a liquid crystal display, for example, and displays various screens. In particular, a game development screen and the like are displayed on the display unit 12d.

The storage unit 12e is constituted by, for example, a hard disk, a RAM (random access memory), a ROM (read only memory), or the like. A program (e.g., non-transitory computer-readable medium including instructions to be performed on a processor) for operating the various components of the planner terminal 12 is stored in the storage unit 12e. Alternatively, various kinds of control data, various kinds of processing result data, and the like are stored in the storage unit 12e.

Figure 4:
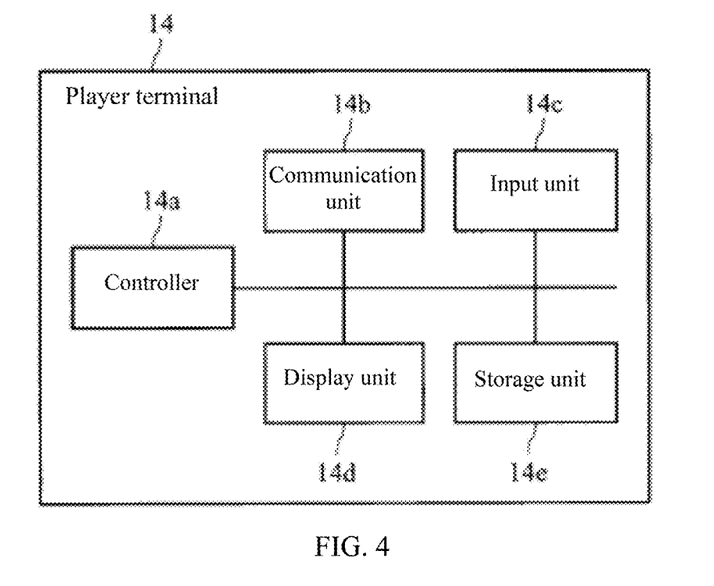
FIG. 4 A simplified configuration diagram of a player terminal.

FIG. 4 is a simplified configuration diagram of the player terminal 14. In this embodiment, a portable terminal such as a smartphone or a tablet terminal is used as the player terminal 14, but the player terminal 14 may be a desktop computer instead.

A controller 14a is constituted by, for example, a CPU or a microprocessor, and controls the various components of the player terminal 14 in accordance with a client program (e.g., non-transitory computer-readable medium including instructions to be performed on a processor) for the game that is stored in a storage unit 14e (discussed below).

A communication unit 14b is constituted by a network adapter, for example, and has the function of communicating with the game server 16 via the communication line 18.

An input unit 14c is constituted by, for example, a touch panel or buttons. The input unit 14c is for inputting instructions from the player to the player terminal 14.

A display unit 14d is constituted by, for example, a liquid crystal display, and is used to display various screens. In particular, a game screen and the like are displayed on the display unit 14d.

A storage unit 14e is constituted by, for example, a RAM or a ROM. A client program (e.g., non-transitory computer-readable medium including instructions to be performed on a processor) for the game is stored in the storage section 14e. Alternatively, the storage section 14e stores various kinds of control data, various kinds of game processing result data, and the like.

Figure 5:
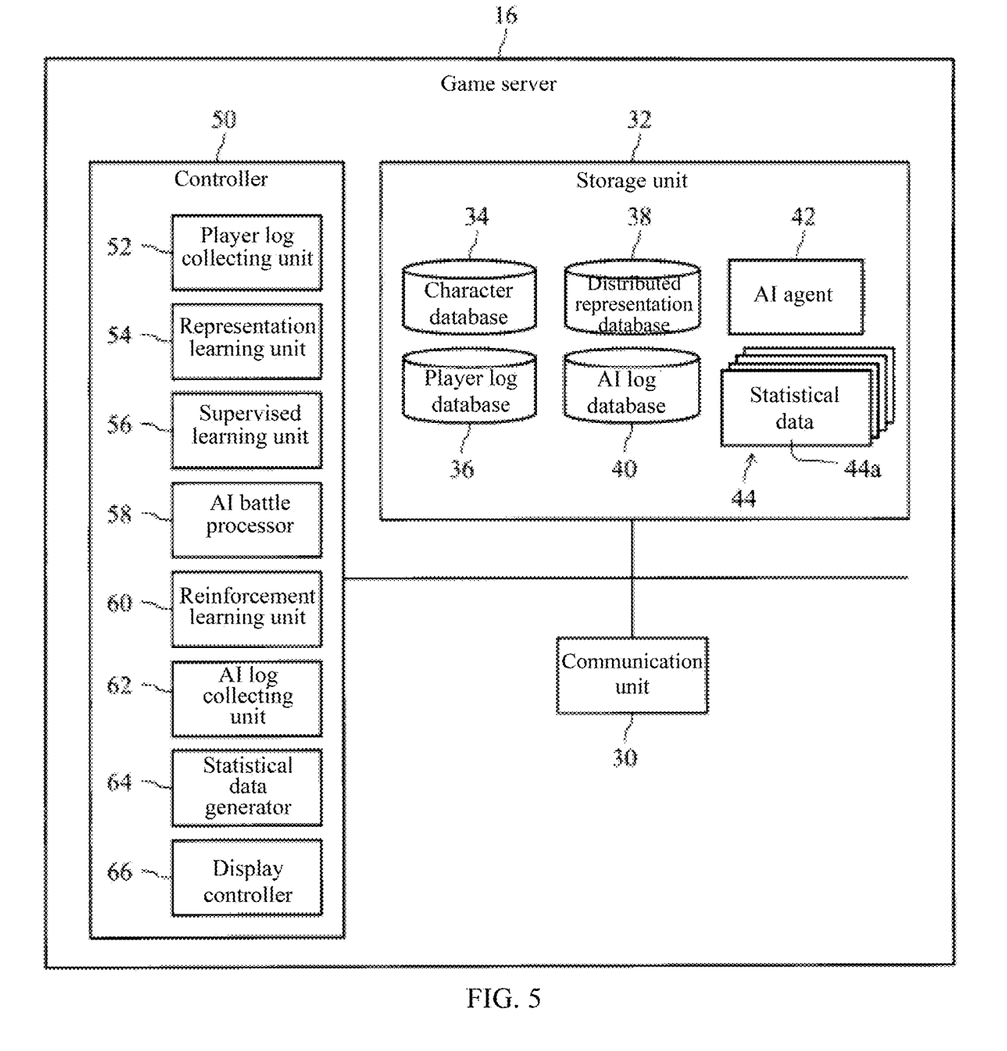
FIG. 5 A simplified configuration diagram of a game server.

FIG. 5 is a simplified configuration diagram of the game server 16.

A communication unit 30 is constituted by a network adapter, for example, and has the function of communicating with the planner terminal 12 and the player terminal 14 via the communication line 18.

A storage unit 32 is constituted by, for example, a hard disk, a RAM, a ROM, or the like. In the storage unit 32, a host program (e.g., non-transitory computer-readable medium including instructions to be performed on a processor) for the game is stored as an information processing program. When the host program is executed, the game proceeds and the various components of the game server 16 operate. As shown in FIG. 5, a statistical data group 44 composed of a character database 34, a player log database 36, a distributed representation database 38, an AI log database 40, an AI agent 42, and a plurality of statistical data 44a is stored in the storage unit 32.

The character database 34 is a database which is defined in this game (that is, by the host program) and which stores data related to characters that can be used by the player or the opponent within this game. More specifically, the character database 34 stores various parameters set for various characters. In this game, it is possible to use well over a thousand characters, and the game is designed so that new characters are added on an ongoing basis.

Figure 6:
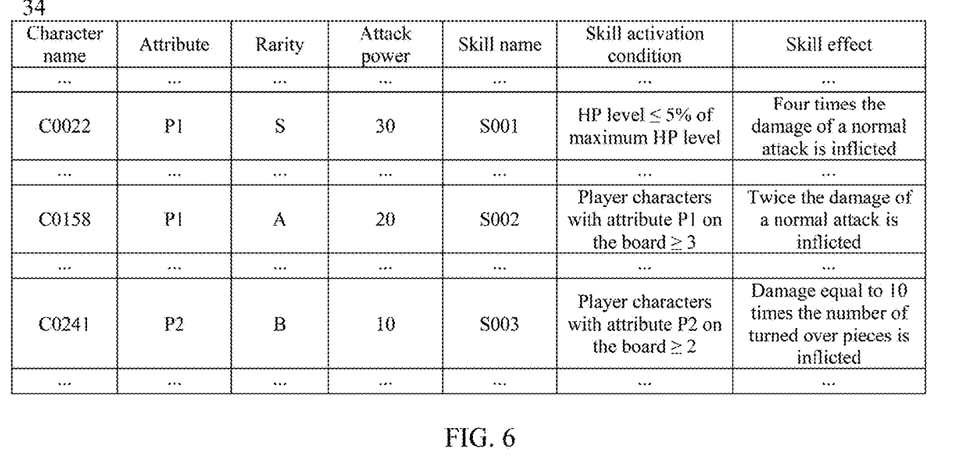
FIG. 6 A table showing a content example of a character database.

FIG. 6 shows an example of the contents of the character database 34. In FIG. 6, the character database 34 is shown in a table format, but the data format of the character database 34 is not limited to this. In FIG. 6, one record corresponds to one character. In this embodiment, each character has parameters of a character name, an attribute indicating the characteristics of the character, a rarity indicating how difficult it is to obtain that character, an attack power serving as a reference for damage inflicted on an opponent when that character is placed on the board 20, a skill name, a skill activation condition indicating the condition under which the skill of that character is activated, and a skill effect which is the effect when the skill is activated.

The term "normal attack" in the skill effect column means that a character is placed on the board 20 and inflicts damage on an opponent on the basis of the value of the attack power, without the skill being activated.

These parameters are defined by the planner. Of course, the parameters are not limited to those listed above, and the characters may have other parameters. For example, as shown in FIG. 6, in this embodiment, the skill activation condition of each character is prescribed by conditions related to the game situation, such as "HP level ≤5% of maximum HP level" or "Player characters with attribute P1 on the board ≥3."

Returning to FIG. 5, various kinds of data are stored in the player log database 36, the distributed representation database 38, and the AI log database 40. The data stored in these databases will be described in detail below.

The AI agent 42 is an artificial intelligence program (e.g., non-transitory computer-readable medium including instructions to be performed on a processor) for playing this game. The AI agent 42 learns by a method featuring deep learning (discussed below). The learning method of the AI agent 42 will be described in detail below. The AI agent 42 in this embodiment is constituted by a multilayer neural network. Since a multilayer neural network is defined by various parameters (layer structure, neuron structure in each layer, weighting or bias of each neuron, etc.), the storage unit 32 stores these parameters.

The statistical data 44a is related to character usage results. In this embodiment, the statistical data 44a is generated for each character, and the sets of statistical data 44a corresponding to the various characters collectively make up a statistical data group 44. The statistical data 44a is generated by a statistical data generator 64 (discussed below), and will be described in detail below.

A controller 50 is constituted by, for example, a CPU, a GPU (graphics processor), a microprocessor, or the like, and controls the various components of the game server 16 in accordance with a host program (e.g., non-transitory computer-readable medium including instructions to be performed on a processor) for the game stored in the storage unit 32. As shown in FIG. 5, the controller 50 also functions, via the host program, as a player log collecting unit 52, a representation learning unit 54, a supervised learning unit 56, an AI battle processor 58, a reinforcement learning unit 60, an AI log collecting unit 62, a statistical data generator 64, and a display controller 66. These functions of the controller 50 will be described below.

The player log collecting unit 52 acquires a player log, which is information about the game situation related to this game, and stores it as the player log database 36. A player log includes information about objects that have an effect in the game, which is a game progress history of the player. The player log collecting unit 52 acquires a player log when the game played by the player is finished, or during game play. Incidentally, the "player" referred to here may include the developer of this game, and the player log collecting unit 52 may acquire a log related to test play by the developer. In any case, the player log is a log related to actual game play by a human.

Figure 7:
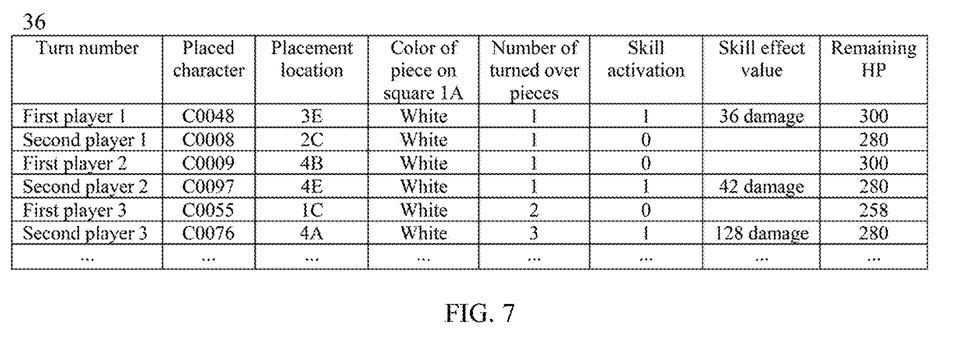
FIG. 7 A table showing a content example of a player log database.

FIG. 7 shows an example of the contents of the player log database 36. In FIG. 7 the player log database 36 is shown in a table format, but the data format of the player log database 36 is not limited to this. As described above, since a first player and a second player alternately place characters on the board 20 in this game, the player log database 36 includes: "turn number;" "placed character," which indicates the character placed on the board 20 by the first player or the second player during that turn; "placement location," which indicates the place where that character is placed in that turn; "number of turned over pieces," which indicates the number of opponent stones or opponent characters turned over during that turn; "skill activation," which indicates whether or not the skill of the character placed in that turn has been activated; and "skill effect value," which indicates the effect activated by that skill activation (such as the amount of damage). Of course, the items shown in FIG. 7 are just one example, and the player log may include other items. For instance, items such as the actual amount of damage inflicted on an opponent by a character's normal attack may be included. Thus, the player log includes usage results ("number of pieces turned over," "skill activation," or "skill effect value") when the first player or the second player used each character (that is, placed that character on the board 20).

Thus storing a player log makes it possible to reproduce the arrangement of stones and characters on the board 20 in each turn of the electronic game, the pieces in hand 22 placed in the deck, characters used (placed on the board 20) in each turn, and the effect on the electronic game thus obtained (the effect activated by the character's skill, and the opponent's stones or opponent characters that are turned over).

The representation learning unit 54 performs representation learning, using as input data the player log serving as a game log and stored in the player log database 36. Consequently, characteristic vectors representing the characteristics of each character registered in the character database 34 are learned. That is, the representation learning unit 54 learns the distributed representation of each character used in this game.

The representation learning unit 54 performs representation learning using a learning device for representation learning constituted by a neural network, for example. In the representation learning in this embodiment, the values of the various elements for the characteristic vectors of each character, using as input data a combination of information about the effect on the game, excluding information about at least one object (character) from the player log indicating information about the game situation, are learned from the result and effect of the game thus generated in that turn.

As a first learning pattern, representation learning is performed using information excluding information about the character used in that turn in the player log of each turn. That is, if we let gt be the current game situation expressed by the player log at turn t, and let ct1 be the character used at turn t, representation learning is performed using (gt,ct1) as input data. This allows a first characteristic vector (distributed representation) to be obtained for the character ct1. rt, which is the generated effect acquired from the player log database 36 (the effect activated by the skill of the character, or the opponent's stone or an opponent character that is turned over), is used as an instruction signal during learning.

As a second learning pattern, representation learning is performed using information excluding the information about one character placed on the board 20 in an offensive turn in the player log. That is, if we let gt be the current game situation expressed by the player log in turn t, and let ct2 be one offensive character placed on the board 20 in turn t, representation learning is performed using (gt,ct2) as input data. The above-mentioned rt is used as an instruction signal during learning. This allows a second characteristic vector (distributed representation) for the character ct2 to be obtained. At this point, if a plurality of offensive characters are placed on the board 20, it is preferable to exclude these offensive characters one at a time randomly and perform representation learning by using them as input data. Also, when a plurality of offensive characters are placed on the board 20, it is preferable to exclude all the characters on the offensive side one by one and to perform representation learning by using them as input data.

As a third learning pattern, representation learning is performed using information excluding information about one character placed on the board 20 in a defensive turn in the player log. That is, if we let gt be the current game situation expressed by the player log in turn t, and let ct3 be one defensive character placed on the board 20, representation learning is performed using (gt,ct3) as input data. The above-mentioned rt is used as an instruction signal during learning. This allows a third characteristic vector (distributed representation) to be obtained for the character ct3. At this point, if a plurality of defensive characters are placed on the board 20, it is preferable to exclude these defensive characters one at a time randomly and perform representation learning by using them as input data. Also, when a plurality of defensive characters are placed on the board 20, it is preferable to exclude all the characters on the defensive side one by one and to perform representation learning by using them as input data.

Figure 8:
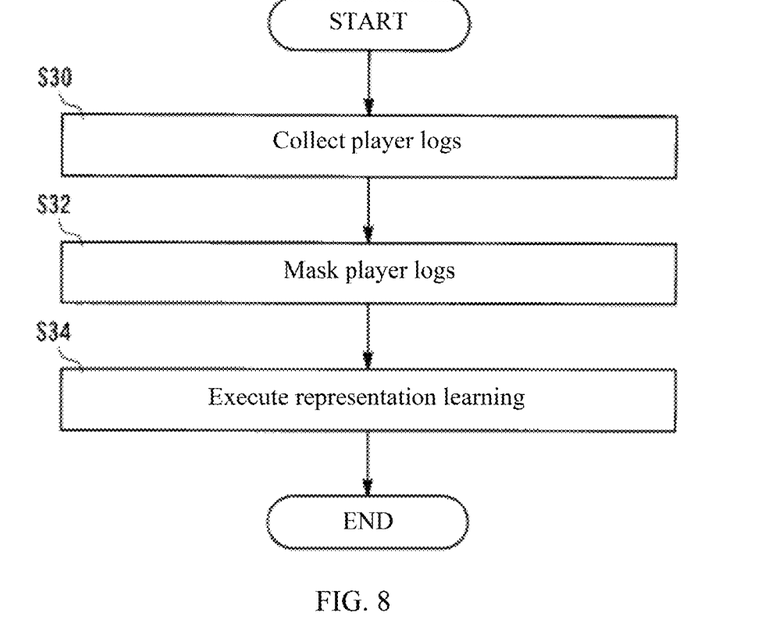
FIG. 8 A flowchart of the method for learning a characteristic vector for a character according to this embodiment.

FIG. 8 is a flowchart of a method for learning the characteristic vectors of characters according to this embodiment. In step S30, player log collection processing is performed. It is preferable here to collect as many player logs as possible. In step S32, mask processing is performed on the player logs. Mask processing involves performing processing to find player logs excluding those characters that are to be excluded, for the first to third learning patterns mentioned above. In step S34, representation learning is performed using the masked player logs.

Figure 9:
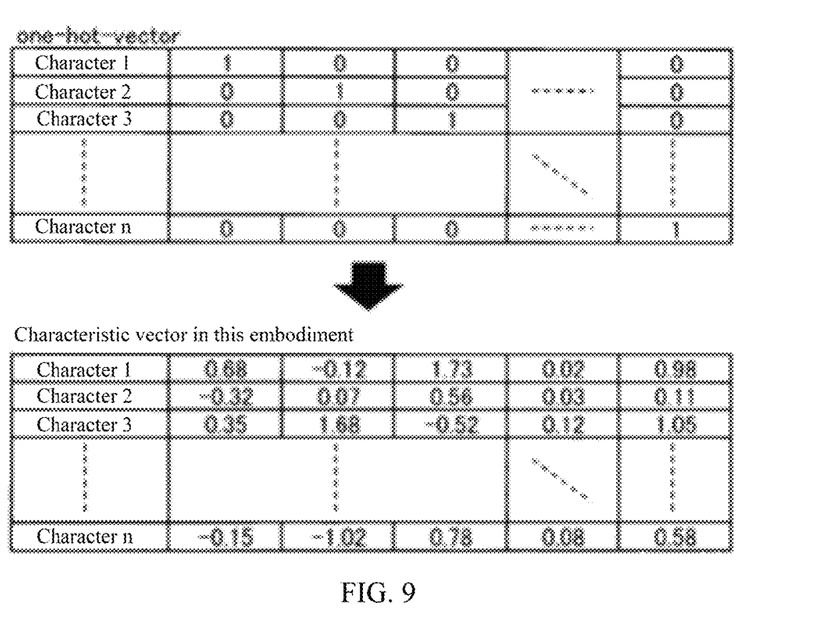
FIG. 9 A table illustrating the characteristic vectors of characters.

As a result, it is possible to find characteristic vectors (distributed representation) having fewer dimensions than the number of types of characters for each of the plurality of types of characters. That is, as shown in FIG. 9, each characteristic that had been represented by the same number of characteristic vectors as the types of characters using one-hot vector can be represented by fewer dimensions of characteristic vectors (distributed representation).

Figure 10:
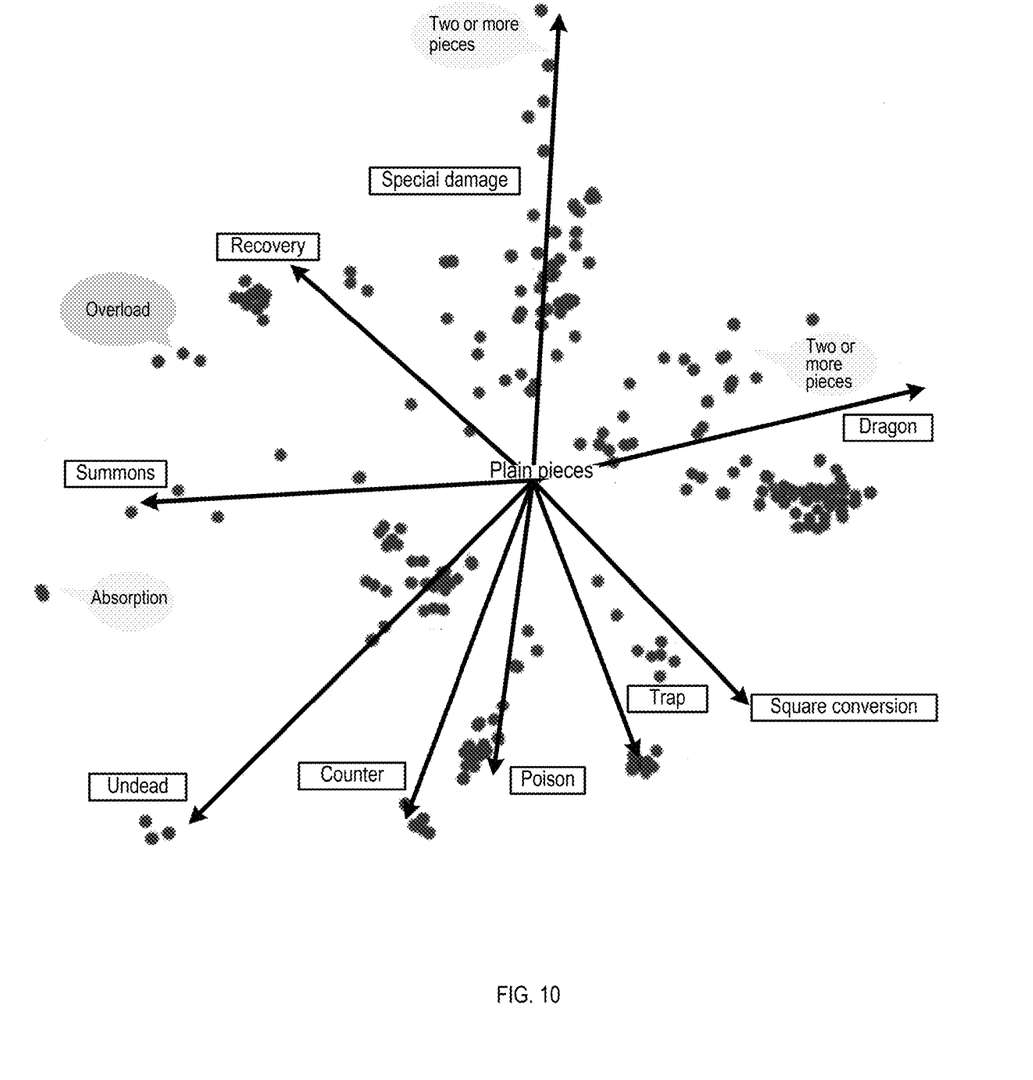
FIG. 10 A diagram showing an example of the results of representation learning of the characteristic vectors of characters.

For example, if five-dimensional characteristic vectors (distributed representation) are found for each of the first to third learning patterns for 300 types of characters, one character can be represented by a 15-dimensional characteristic vector (distributed representation) through a combination of these. FIG. 10 shows an example of the results of performing representation learning so as to obtain a five-dimensional characteristic vector (distributed representation) for each of about 300 types of characters in the first learning pattern, and using principal component analysis to map a five-dimensional characteristic vector in a 3-dimensional space. FIG. 10 shows representations indicated by the characteristics of a character as considered by a human (special damage, recovery, summons, etc.) when characters are matched with a characteristic vector (distributed representation) (the characteristic vector is not acquired by directly matching the representation axis of these). As shown in FIG. 10, it can be seen that the characteristics of a character are suitably represented by the characteristic vector (distributed representation).

Thus representing each character in a distributed manner makes it possible to represent a large number of characters with lower-dimensional vectors. Also, characters with similar strategic characteristics in this game will be represented by similar characteristic vectors. Various known learning methods can be used as the method of representation learning.

In this embodiment, representation learning is performed on all but one character, but if the goal is to obtain a characteristic vector representing the influence on a game by a combination of a plurality of characters, the plurality of characters may be excluded from the representation learning.

The characteristic vector (distributed representation) of each character learned by the representation learning unit 54 is stored in the distributed representation database 38. In addition to or instead of player logs, the representation learning unit 54 may perform representation learning using an AI log as a game log indicating game progress history by the AI agent 42 produced by the AI battle processor 58 (discussed below).

The supervised learning unit 56 uses at least the player logs stored in the player log database 36 and the characteristic vectors of the characters learned by the representation learning unit 54 to cause the AI agent 42 to learn a strategy related to the use of each character. A strategy related to the use of each character means a strategy including which character having which characteristics should be used in a given game state, or which position on the board 20 the character should be placed.

More specifically, the supervised learning unit 56 uses as input the game state, such as the characteristic vector, placement position, turn number, actionable hands, hit points, and the like of the characters present on the board or among the pieces in hand at a certain point in the game, and uses learning data in which the output is the evaluation value of the behavior information inputted in the inputted game state to cause the AI agent 42 to learn. This evaluation value is calculated in advance on the basis of the player logs. That is, the supervised learning unit 56 causes the AI agent 42 to learn by supervised learning.

In learning by the supervised learning unit 56, learning is performed after each character has been represented with a characteristic vector, so the learning entails less calculation than when each character is individually labeled. Also, since characters having similar characteristics are represented by similar characteristic vectors, learning related to a given character becomes learning related to characters similar to that character. In other words, an effect of generalization of the learning can be anticipated.

The AI battle processor 58 performs processing for allowing AI agents 42 that received learning by the supervised learning unit 56 or further learning by the reinforcement learning unit 60 (discussed below) to do battle in this game. In a battle between AI agents 42, everything from the selection of the characters to put in the deck may be left up to the AI agents 42. Also, the AI battle processor 58 may extract a trend deck, which is a deck frequently used by the user, from the player logs stored in the player log database 36, and cause the AI agent 42 to use this trend deck.

Also, the AI battle processor 58 may be such that pre-release characters, that is, those that are under development that cannot yet be used by regular players, are included in at least one deck of the two AI agents 42 engaged in battle.

The reinforcement learning unit 60 performs reinforcement learning, which is learning for reinforcing the AI agent 42. Reinforcement learning is a method that differs from supervised learning, and Q learning, for example, can be used as reinforcement learning. More specifically, in reinforcement learning, a reward is given to the AI agent 42 based on the result of a series of actions (such as winning or losing) selected by the AI agent 42 from a certain game state, and the AI agent 42 learns the action that should be taken on the basis of this reward.

In this embodiment, in reinforcement learning, the reinforcement learning unit 60 performs learning on the basis of the result of battle between the AI agents 42 by the AI battle processor 58. The reinforcement learning unit 60 may be designed to perform reinforcement learning on the basis of the player logs stored in the player log database 36. Also, in reinforcement learning, the reinforcement learning unit 60 may be designed to perform reinforcement learning on the basis of the result of battle between AI agent 42 and an NPC (non-player character; a rule-based AI that is not an AI agent 42), or the result of battle between the AI agent 42 and a human player.

In this game, the action that the AI agent 42 can take will vary depending on the game state. For instance, the positions where characters can be placed will vary with the state of the board 20, and the characters that can be used in the first place will vary with the pieces in hand 22. Therefore, in this embodiment, reinforcement learning is performed by a method in which both a given game state and the action taken by the AI agent 42 are used as inputs, and an index indicating the value of the inputted action is outputted.

Even in reinforcement learning, it is preferable to learn while using the characteristic vectors of the characters learned by the representation learning unit 54. This allows the same effect as in the supervised learning unit 56 to be obtained in reinforcement learning as well.

In this embodiment, the supervised learning unit 56 and/or the reinforcement learning unit 60 corresponds to a strategy learning unit. That is, strategy learning that causes the AI agent 42 to learn the strategy related to the use of each character is either supervised learning or reinforcement learning, or both.

The AI log collecting unit 62 shows the game progress history of this game by the AI agents 42 according to the AI battle processor 58, acquires AI logs, which are data including the usage results of a plurality of characters, and stores these logs in the AI log database 40. Since an AI log has items equivalent to those in a player log, the AI log will not be described in detail here. The difference between a player log and an AI log is only whether it indicates the game progress history by a player or the game progress history by an AI agent 42. The AI log collecting unit 62 may be designed to acquire not only logs of battles between AI agents 42, but also logs of battles between an AI agent 42 and an NPC, as AI logs.

When the AI battle processor 58 includes an under-development character in the deck of the AI agent 42, the AI log collecting unit 62 can acquire an AI log that includes the usage results for the under-development character. Thus, according to battle between AI agents 42, it is possible to acquire a log of when an under-development character is actually used in this game, prior to the release of the under-development character.

The statistical data generator 64 generates statistical data 44a on the basis of the AI logs stored in the AI log database 40. As described above, the statistical data 44a is generated for each character, and is related to the usage results for each character. Of course, if an AI log includes the usage results for an under-development character, the statistical data generator 64 generates statistical data 44a related to the usage results for the under-development character. In the following description of the statistical data 44a, as a general rule, the term "character" also includes characters under development.

For example, the statistical data 44a may include the winning percentage when a character is used. In this case, the statistical data generator 64 extracts from the AI log the character in question and whether or not the AI agent 42 won when the character in question was used, and calculates the winning percentage related to the character in question.

Also, the statistical data 44a may include the probability of activating a skill when a character is used. In this case, the statistical data generator 64 extracts from the AI log the character in question and whether or not a skill was activated when the character in question was used, and calculates the skill activation probability for the character in question.

Also, the statistical data 44a may include the distribution of the effects that arise when a character is used. In this case, the statistical data generator 64 extracts from the AI log the character in question and the skill effect value when the character in question has activated a skill, and calculates the distribution of the skill effect value for the character in question. Alternatively, the effect that arises when a character is used may include the amount of damage inflicted on the opponent when a character makes a normal attack, that is, the statistical data generator 64 extracts from the AI log the character in question and the damage inflicted on the opponent by a normal attack by the character in question, and calculates the distribution of damage of a normal attack by the character in question.

As described above, in this embodiment, the statistical data 44a includes the winning percentage when using a character, the activation probability when using a character, and/or the distribution of the effect that arises when using a character. Of course, other data may be included in the statistical data 44a.

As a result of the above processing, the statistical data generator 64 generates statistical data 44a for a plurality of the characters registered in the character database 34, and ideally all of the characters. This forms the statistical data group 44.

The display controller 66 causes the display unit 12d of the planner terminal 12 to display the statistical data 44a generated by the statistical data generator 64 in response to a request from the planner terminal 12 (that is, from the planner). The display controller 66 also causes the display unit 14d of the player terminal 14 to display the statistical data 44a generated by the statistical data generator 64 in response to a request from the player terminal 14 (that is, from the player). It is assumed that the display controller 66 does not cause the display unit 14d of the player terminal 14 to display statistical data 44a related to under-development characters.

Figure 11:
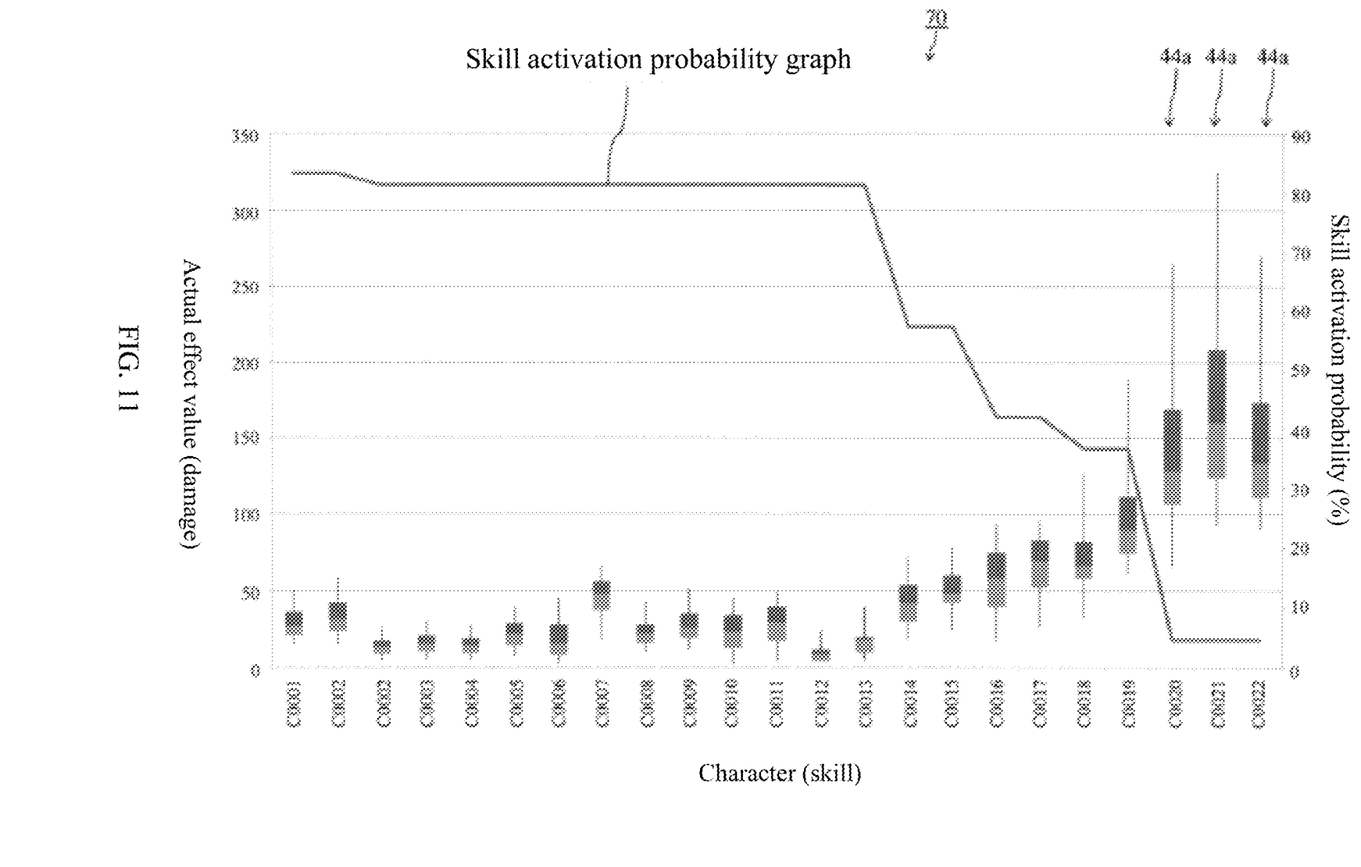
FIG. 11 A graph showing a display example of a plurality of statistical data.

FIG. 11 shows a display example of a plurality of statistical data 44a in this embodiment. Among the statistical data group 44, the statistical data 44a to be displayed may be selected according to an instruction from the planner or the player. For example, it is possible to display a plurality of statistical data 44a related to skills of a plurality of characters having common parameters for parameter items (rarity, attributes, skill activation condition, skill effect, type of skill, etc.) instructed by the planner or player. For example, FIG. 11 shows a state in which a plurality of statistical data 44a for characters in the statistical data group 44 that have a rarity of "S" and have a damage skill are displayed. Preferably, these statistical data 44a are displayed in a format that allows them to be compared. For instance, a plurality of statistical data 44a are lined up and displayed as shown in FIG. 11. A single statistical data 44a selected by the planner or the player may also be displayed. In this specification, the plurality of statistical data 44a displayed on the planner terminal 12 or the player terminal 14 are referred to collectively as a statistical graph 70.

In this embodiment, as the name implies, the statistical graph 70 is displayed in the form of a graph. Character names are arranged on the horizontal axis of the statistical graph 70. In the example of FIG. 11, a plurality of characters are arranged such that the skill activation probability of the character arranged at the leftmost is the highest, and the skill activation probability decreases moving from the left to the right.

The vertical axes of the statistical graph 70 indicate the skill effect value and the skill activation probability. More specifically, the vertical axis on the left side shows the skill effect value, and the vertical axis on the right side shows the skill activation probability. In the display example of FIG. 11, the distribution of the skill effect values of the characters is represented by a box-and-whisker plot. More specifically, the lower limit of the whisker represents the 5th percentile of the skill effect value (the effect values that are 5% from the bottom when the damage distribution is arranged in descending order), the lower limit of the box represents the 25th percentile of the skill effect value, the horizontal line in the box represents the median of the skill effect value, the upper limit of the box represents the 75th percentile of the skill effect value, and the upper limit of the whisker represents the 95th percentile of the skill effect value.

Meanwhile, for the skill activation probability, points are plotted on the graph for the various characters. In the example of FIG. 11, the points of skill activation probability for a plurality of characters are linked together to form a skill activation probability graph. As described above, in the example of FIG. 11, since the characters are arranged in order of the skill activation probability, it can be grasped that the skill activation probability graph shows lower skill activation probability moving to the right.

Since each character included in the statistical graph 70 shown in FIG. 11 has the same degree of rarity, it is preferable for the characters to have equivalent values. Therefore, from the standpoint of the skill activation probability and the skill effect value, for these characters, the higher is the skill activation probability, the smaller is the skill effect value, and the lower is the skill activation probability, the larger is the skill effect value should be. Conversely, if the skill effect value is high despite a high skill activation probability, the character ends up being one in which a powerful skill can be activated frequently, and the character ends up having a higher value than the other characters of the same rarity. Also, if the skill effect value is low despite a low skill activation probability, the effect of the activated skill ends up being weak regardless of the low skill activation probability, and this character ends up being one having a lower value than the other characters of the same rarity. As such, the game balance is lost if there is no balance between the skill activation probability and the skill effect value among characters having equal value.

In the statistical graph 70 of FIG. 11, the higher is the skill activation probability, the lower is the skill effect value, and the lower is the skill activation probability, the higher is the skill effect value, which means that the parameters of the characters are set relatively appropriately. On the other hand, for example, if a character has a high skill effect value despite a high skill activation probability, or a character has a low skill effect value despite a low skill activation probability, it can be easily ascertained from the statistical graph 70 that such a character (abnormal character) exists. The reason why the skill activation probability and the skill effect value of an abnormal character are not well balanced is that an inappropriate value (abnormal value) is set for one of the parameters of the abnormal character. Therefore, it can be said that the statistical graph 70 is for detecting an abnormal value possessed by an abnormal character, and that the planner can easily ascertain a character having an abnormal value by means of the statistical graph 70. The term "abnormal value" objectively means a value which will cause this character to exhibit performance (strength) that is not suitable for the value of the character (corresponds to "degree of rarity" in this embodiment), and subjectively means a value which will cause this character to exhibit performance that was unintended by the planner.

The statistical graph 70 is useful not only for a planner but also for a player. For example, the statistical graph 70 can be referred to when selecting a character that will be used by the player in this game (that is, a character to be placed in the deck).

A summary of the game system 10 according to this embodiment was described above. According to this embodiment, learning by the AI agent 42 is performed by the supervised learning unit 56 or the reinforcement learning unit 60 after each character has been represented by a characteristic vector by the representation learning unit 54. Consequently, learning by the AI agent 42 can be performed more efficiently. More specifically, as described above, this results in a reduction in the amount of computation by compressing the dimensions of vectors representing characters, and in a generalization of learning.

In this embodiment, the statistical data 44a is generated on the basis of the AI logs resulting from battles between the learned AI agents 42 or between an AI agent 42 and an NPC. Since an AI agent 42 or an NPC can continue playing as long as the game server 16 is operating, it is possible to acquire an enormous amount of AI logs in comparison with player logs. This improves the dependability of the statistical data 44a. In addition, it is possible to acquire an AI log related to an under-development character, that is, statistical data 44a related to an under-development character can be generated, by using the AI agent 42 to do battle when a player log cannot be acquired because an under-development character has yet to be released. This makes it possible for the planner to set the parameters of under-development characters more appropriately.

Figure 12:
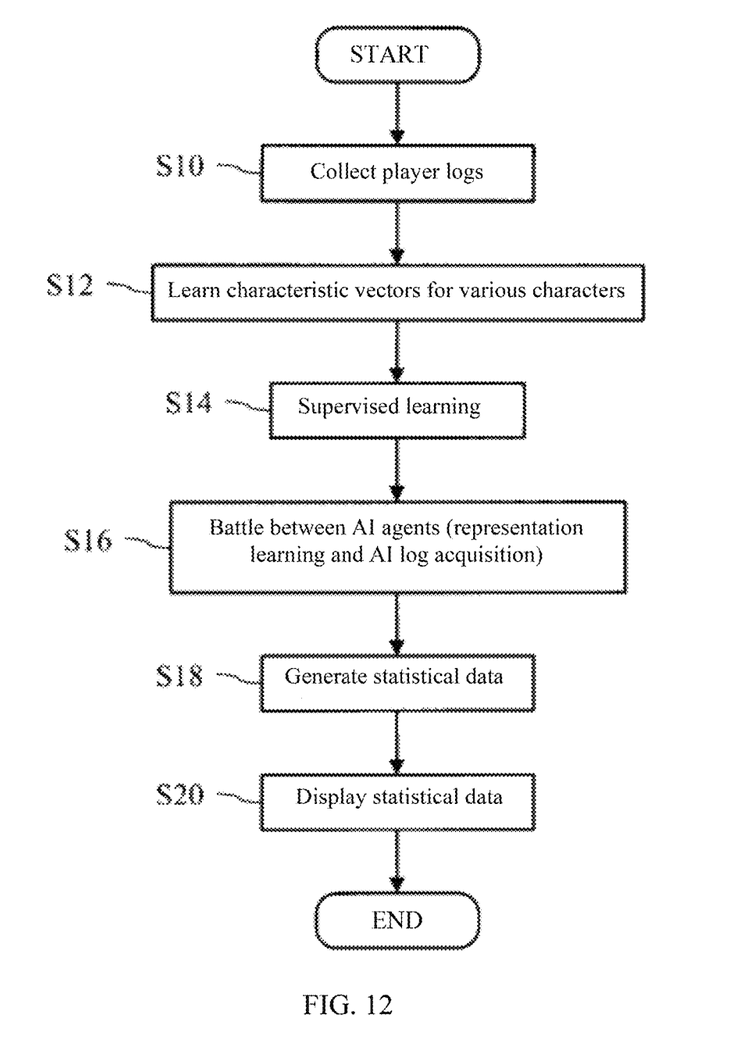
FIG. 12 A flowchart showing the flow of processing in the game server according to this embodiment.

The processing flow of the game server 16 will now be described through reference to the flowchart shown in FIG. 12.

In step S10, the player log collecting unit 52 collects player logs and stores them in the player log database 36.

In step S12, the representation learning unit 54 learns the characteristic vectors of the various characters on the basis of the player logs acquired in step S10.

In step S14, the supervised learning unit 56 performs supervised learning for the AI agent 42, using the characteristic vectors of the various characters obtained in step S12, on the basis of the player logs acquired in step S10.

In step S16, the AI battle processor makes the AI agents 42 learned in step S14 do battle in this game. The reinforcement learning unit 60 performs reinforcement learning for further strengthening the AI agents 42 learned in step S14 on the basis of the battle results between the AI agents 42. Also, the AI log collecting unit 62 acquires AI logs related to the battle between the AI agents 42. The battle between the AI agents 42 is repeatedly executed, which strengthens the AI agents 42, and a large amount of AI logs are acquired.

In step S18, the statistical data generator 64 generates a plurality of statistical data 44a related to the usage results of the various characters, on the basis of the AI logs obtained in step S16.

In step S20, in response to a request from the planner terminal 12 or the player terminal 14, the display controller 66 causes the planner terminal 12 or the player terminal 14 to display the statistical data 44a generated in step S18.

An embodiment according to the present invention was described above, but the present invention is not limited to or by the above embodiment, and various modifications are possible without departing from the gist of the present invention.

DESCRIPTION OF THE REFERENCE NUMERALS

10 game system
12 planner terminal
12a, 14a, 50 controller
12b, 14b, 30 communication unit
12c, 14c input unit
12d, 14d display unit
12e, 14e, 32 storage
14 player terminal
16 game server
34 character database
36 player log database
38 distributed representation database
40 AI log database
42 AI agent
44 statistical data group
44a statistical data
52 player log collecting unit
54 representation learning unit
56 supervised learning department
58 AI battle processor
60 reinforcement learning
62 AI log collector
64 statistical data generator
66 display controller
70 statistical graph

The invention claimed is:

1. An information processing device, comprising:
at least one hardware processor; and
one or more software modules configured to, when executed by the at least one hardware processor,
access a game log comprising a game progress history related to an electronic game in which a plurality of objects are used, wherein the game progress history represents each of a plurality of game situations, and one or more of the plurality of objects used in each of the plurality of game situations,
for each of the plurality of objects, derive a characteristic vector representing the object by, for each of one or more of the plurality of game situations in which the object is used, excluding the object as it was used in that same situation from that game situation to identify an effect of the object on that game situation, and
use the characteristic vectors for the plurality of objects in a machine learning process, to train an artificial intelligence (AI) agent to play the electronic game.

2. The information processing device according to claim 1, wherein the one or more game situations from which each object is excluded comprise game situations in which that object was used during an attack.

3. The information processing device according to claim 1, wherein the one or more game situations from which each object is excluded comprise game situations in which that object was used during a defense.

4. The information processing device according to claim 1, wherein deriving the characteristic vectors comprises, for each of the plurality of objects, combining a plurality of individual vectors obtained for that object into an overall characteristic vector for that object.

5. An information processing device according to claim 2, wherein deriving the characteristic vectors comprises for each of the plurality of objects, combining a plurality of individual vectors obtained for that object into an overall characteristic vector for that object.

6. An information processing device according to claim 3, wherein deriving the characteristic vectors comprises, for each of the plurality of objects, combining a plurality of individual vectors obtained for that object into an overall characteristic vector for that object.

7. The information processing device according to claim 1, wherein the AI agent is trained to play the electronic game according to a strategy related to use of the plurality of objects.

8. A non-transitory computer-readable medium including instructions, wherein the instructions, when executed by a processor, cause the processor to:
access a game log comprising a game progress history related to an electronic game in which a plurality of objects are used, wherein the game progress history represents each of a plurality of game situation, and one or more of the plurality of objects used in each of the plurality of game situations;
for each of the plurality of objects, derive a characteristic vector representing the object by, for each of one or more of the plurality of game situations in which the object is used, excluding the object as it was used in that game situation from that game situation to identify an effect of the object on that game situation, and
use the characteristic vectors for the plurality of objects in a machine learning process, to train an artificial intelligence (AI) agent to play the electronic game.

9. The non-transitory computer-readable medium according to claim 8, wherein the one or more game situations from which each object is excluded comprise game situations in which that object was used during an attack.

10. The non-transitory computer-readable medium according to claim 8, wherein the one or more game situations from which each object is excluded comprise game situations in which that object was used during a defense.

11. The non-transitory computer-readable medium according to claim 8, wherein deriving the characteristic vectors comprises, for each of the plurality of objects, combining a plurality of individual vectors obtained for that object into an overall characteristic vector for that object.

12. The non-transitory computer-readable medium according to claim 9, wherein deriving the characteristic vectors comprises, for each of the plurality of objects, combining a plurality of individual vectors obtained for that object into an overall characteristic vector for that object.

13. The non-transitory computer-readable medium according to claim 10, wherein deriving the characteristic vectors comprises, for each of the plurality of objects, combining a plurality of individual vectors obtained for that object into an overall characteristic vector for that object.

14. The non-transitory computer-readable medium according to claim 8, wherein the AI agent is trained to play the electronic game according to a strategy related to use of the plurality of objects.

* * * * *